(12) United States Patent
Blonden et al.

(10) Patent No.: US 8,925,932 B2
(45) Date of Patent: Jan. 6, 2015

(54) AIRLINE TROLLEY DRAWER

(75) Inventors: Sam O. Blonden, Kent (GB); Spencer Davis, Kent (GB)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/994,615

(22) PCT Filed: Dec. 15, 2011

(86) PCT No.: PCT/US2011/065130
§ 371 (c)(1),
(2), (4) Date: Jun. 14, 2013

(87) PCT Pub. No.: WO2012/083008
PCT Pub. Date: Jun. 21, 2012

(65) Prior Publication Data
US 2013/0257250 A1   Oct. 3, 2013

(30) Foreign Application Priority Data
Dec. 16, 2010  (GB) .................................. 1021388.2

(51) Int. Cl.
| | | |
|---|---|---|
| *A63G 13/00* | (2006.01) | |
| *B64D 11/00* | (2006.01) | |
| *A47B 88/04* | (2006.01) | |
| *E05B 65/46* | (2006.01) | |

(52) U.S. Cl.
CPC ............ *B64D 11/00* (2013.01); *B64D 11/0007* (2013.01); *A47B 88/04* (2013.01); *E05B 65/46* (2013.01); *A47B 2210/08* (2013.01); *Y02T 50/46* (2013.01)
USPC ...................................................... 280/1.12

(58) Field of Classification Search
USPC ........... 312/333, 330.1, 334.1, 334.7, 334.27, 312/348.3, 215, 222; 705/85–86; 280/47.18–47.19
See application file for complete search history.

(56) References Cited

U.S. PATENT DOCUMENTS

| | | | |
|---|---|---|---|
| 6,619,770 B1 * | 9/2003 | Drab et al. ..................... 312/333 |
| 2005/0230981 A1 | 10/2005 | Anderson | |
| 2011/0142372 A1 | 6/2011 | Blonden | |

FOREIGN PATENT DOCUMENTS

| | | |
|---|---|---|
| DE | 20118373 U1 | 1/2002 |
| DE | 102006028395 A1 | 12/2007 |

(Continued)

OTHER PUBLICATIONS

ISR and Written Opinion for PCT/US2011/065130 dated Apr. 4, 2012.

(Continued)

*Primary Examiner* — John Walters
*Assistant Examiner* — James Triggs
(74) *Attorney, Agent, or Firm* — Lowe Hauptman & Ham LLP (57) ABSTRACT

A drawer for an airline trolley, which has a generally rectangular tray, is closed by a lid. The lid has a flap which is openable, and the drawer has a lock unit with which the flap engages. The lock unit is lockable by a breakable seal. The flap can be hinged about a line extended across the lid at a position forward of the back of the tray. The flap can be connected to the sides of the tray by webs which fold under the flap in its closed position, the webs preventing access to the interior of the tray under the lid. The flap can have a catch at its forward end which engages in a lockable chamber on the front of the drawer, a breakable seal being insertable into the chamber to engage the catch.

20 Claims, 7 Drawing Sheets

(56) References Cited

FOREIGN PATENT DOCUMENTS

| EP | 0536583 | A1 | 4/1993 |
| EP | 1535264 | A1 | 6/2005 |
| GB | 2358377 | A | 7/2001 |
| GB | 2463472 | A | 3/2010 |
| JP | 47032518 | A | 12/1972 |
| KR | 1020080093523 | A | 10/2008 |
| WO | 8703791 | A1 | 7/1987 |
| WO | 0219231 | A1 | 3/2002 |

OTHER PUBLICATIONS

GB Search Report for 1021388.2 dated Apr. 6, 2011.

\* cited by examiner

AIRLINE TROLLEY DRAWER

CROSS-REFERENCE TO RELATED APPLICATIONS

The present application is a National Phase of International Application Number PCT/US2011/065130, filed Dec. 15, 2011, and claims the benefit of GB application 1021388.2 filed Dec. 16, 2010.

The invention relates to a drawer for an airline trolley containing items of value, for example duty free items to be sold to passengers during a flight. The invention also relates to a filled airline trolley having a number of the aforementioned drawers, as well as a method for packing airline trolleys.

A conventional airline trolley for items of value, for example duty free goods, consists of a generally cuboid container with a door at the front and interior ribs on which drawers can slide. The door is locked with a security seal in a tamper-evident manner and it is only opened when the flight attendant is ready to offer goods for sale. The tamper-evident seal allows the attendant to know if the container has been opened at an earlier stage, which would imply the possibility of theft.

The drawers are simple open trays which are pulled out by the attendant to get access to the goods purchased by passengers.

The aim of the invention is to provide a new and improved airline trolley and drawers therefore which have an increased level of security.

According to the invention, there is provided a drawer for an airline trolley which comprises a generally rectangular tray with a base, sides, front and back, the sides having means for cooperation with the inside of the trolley for allowing the drawer to slide therein, wherein the drawer includes a lid which closes the top of the tray, wherein the lid comprises at least one flap which is openable, and wherein the drawer has a lock unit with which the flap engages, the lock unit being lockable by means of a breakable seal.

The advantage of the invention is that the drawers can be packed and sealed at any location, for example away from the airport, and delivered in a sealed state for packing into the trolley. Furthermore, any drawers which remain un-opened at the end of a flight can be immediately reused, without any additional labour. At present, with conventional trolleys, each drawer must be checked (and re-stocked if necessary) at the end of a flight because all the trays are freely accessible as soon as the sealed door is opened.

Preferably, the flap of the drawer of the invention is hinged about a line extended across the lid at a position forward of the back of the tray. Preferably, the flap is connected to the sides of the tray by webs which fold under the flap in its closed position, the webs preventing access to the interior of the tray under the lid.

Preferably, the flap has a catch at its forward end which engages in a lockable chamber on the front of the drawer, a breakable seal being insertable into the chamber to engage the catch. Preferably, the flap has a forward part which folds over onto the front of the tray when closed.

Alternatively, the front of the tray can have a flap with a catch at its forward end and the lockable chamber is on the lid.

In one embodiment, the lid is formed of at least two flaps which fold on top of the tray and on top of each other, one flap having an apertured catch which registers with the lock unit on the other flap, a breakable seal being insertable into the lock unit to lock the catch in place. Preferably, there is at least a forward flap hinging from the front of the tray and a rearward flap hinging from a position at or near the rear of the tray.

Optionally, side flaps are provided, connecting with the forward and rearward flaps, the side flaps including tongues with apertures which register with the lock unit when the flaps are folded.

Preferably the cooperating means on the sides are runners in the form of webs.

The tamper-evident lock used in the invention may be as described in GB-A-2358377 or GB-A-2463472, although the precise form of the lock is not critical to the invention.

In practice, a plurality of individually numbered seals will be supplied to the airline or supplier responsible for filling the trolleys in order that the drawers can be re-filled after use and locked again with a fresh seal in a secure and tamper-evident manner.

The invention also provides an airline trolley containing a plurality of drawers as described above. The invention still further provides a method of packing an airline trolley comprising the steps of filling a plurality of lidded drawers with items, closing the lids, locking the lids with a breakable seal, and sliding the drawers into the trolley. Each drawer may be as described above.

Preferred embodiments of the invention are described in more detail below, with reference to the accompanying figures, wherein.

Figure 1:
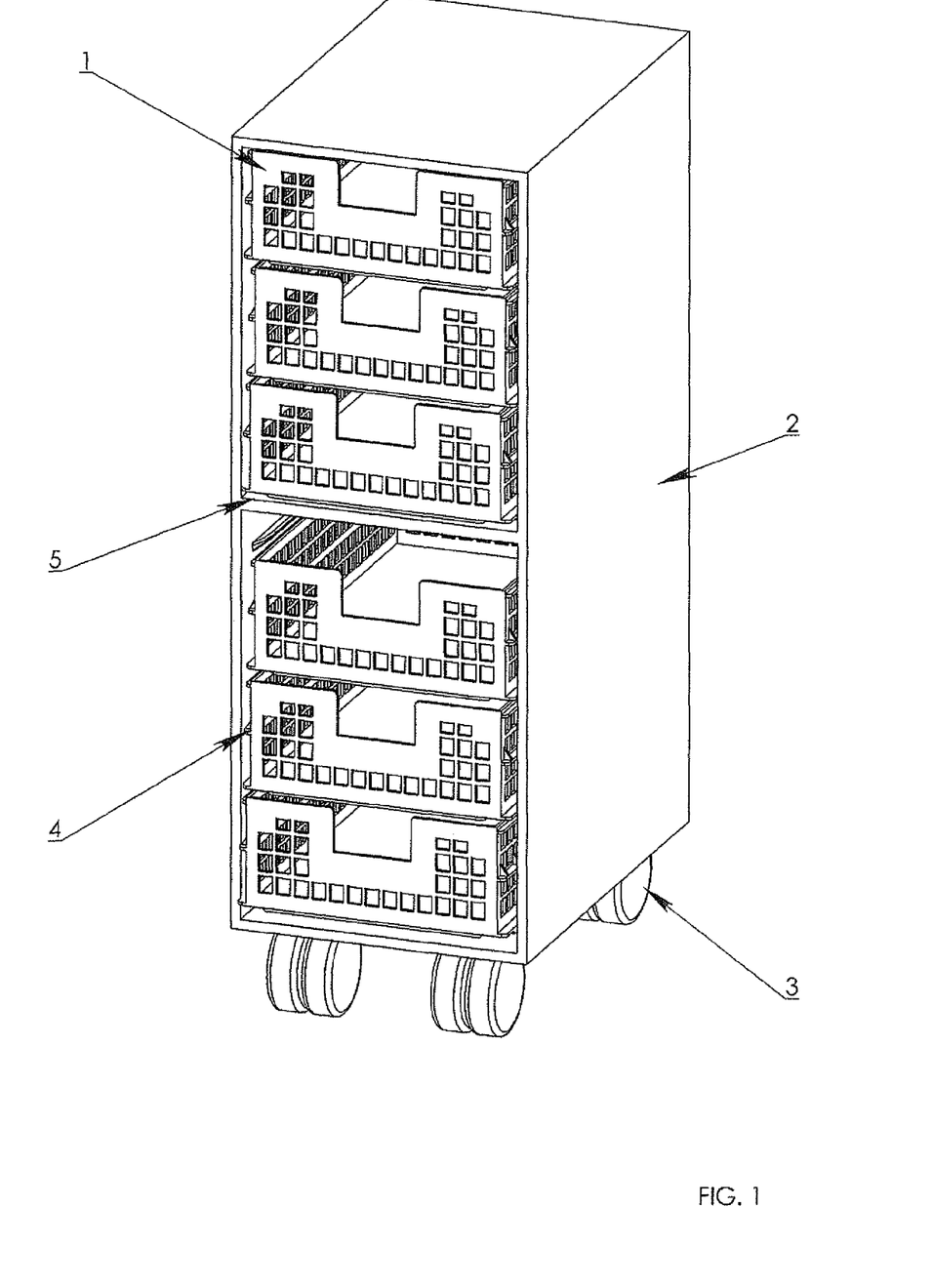
FIG. 1 is a perspective view of an open conventional airline trolley, showing empty slidable trays.

FIG. 1 shows a conventional airline trolley with open trays 1 which can slide in and out of the trolley body 2. The trolley consists of an upright container on wheels 3 which has ribs 4 and or shelves 5 on its interior walls which support a number of trays 1 which can thus be slid in and out. The trays are shown empty but in practice they will hold items of value, for example duty free goods. Furthermore, in practice, the trolley will have a door at the front which is closed with tamper-evident seal so that the airline staff know that the trolley has not been tampered with before they first open it.

Figure 2:
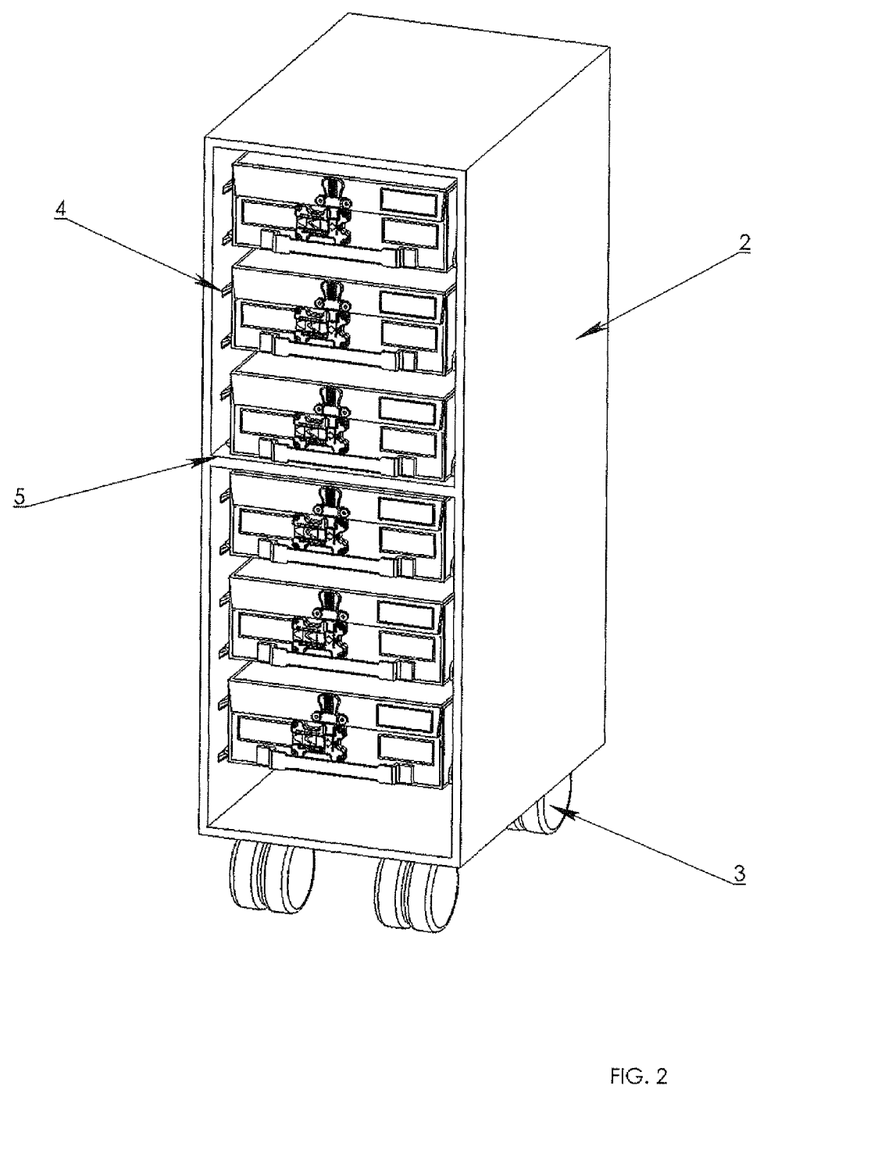
FIG. 2 is a perspective view of an open airline trolley holding a number of drawers according to one embodiment of the invention.

FIG. 2 shows a similar trolley, but with drawers according to one embodiment of the invention. The drawer is described in more detail below. Because in the invention each drawer has its own lock, the trolley need not include the normal lockable door.

Figure 3:
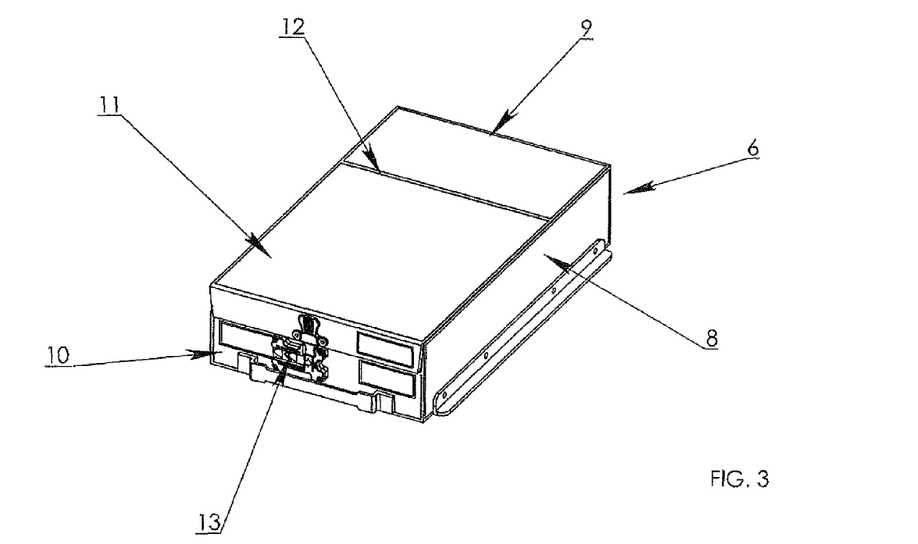
FIGS. 3 and 3a are perspective views of one drawer according to this embodiment of the invention, in its closed and open conditions.

As shown in FIG. 3, each drawer includes a tray 6 with a base 7, sides 8, back 9 and front 10. The drawer includes a lid 11 for the tray. The lid pivots upwardly from the top of the drawer along a hinge or fold line 12 forward of the back of the tray, for example at a position substantially a quarter of the length of the tray from the back. This arrangement allows easy access to all the interior of the tray but reduces the length and thus height of the open lid as compared to a lid hinging from the very back. The lid can be locked by means of a lock-unit 13 on the front of the drawer.

The sides of the tray have runners 14 for cooperating with ribs on the inside of the trolley. Although the runners are shown as one single web or rib on each side of the tray, each runner could be made up of a small number of short webs (two to four). Furthermore, the tray could have instead grooves along its sides for slotting over the ribs in the trolley, though this is less preferred due to increased fabrication costs and increased friction when sliding.

The front of the tray includes a handle 15 at the bottom to assist in sliding the drawer in and out of the trolley. The front of the tray, and/or the lid, may include fields 16 for labels which indicate the contents of the drawer, so that the drawer does not need to be opened for the user to see what is inside. In practice, differently filled drawers will be supplied for stocking a trolley before a flight.

Figure 3A:
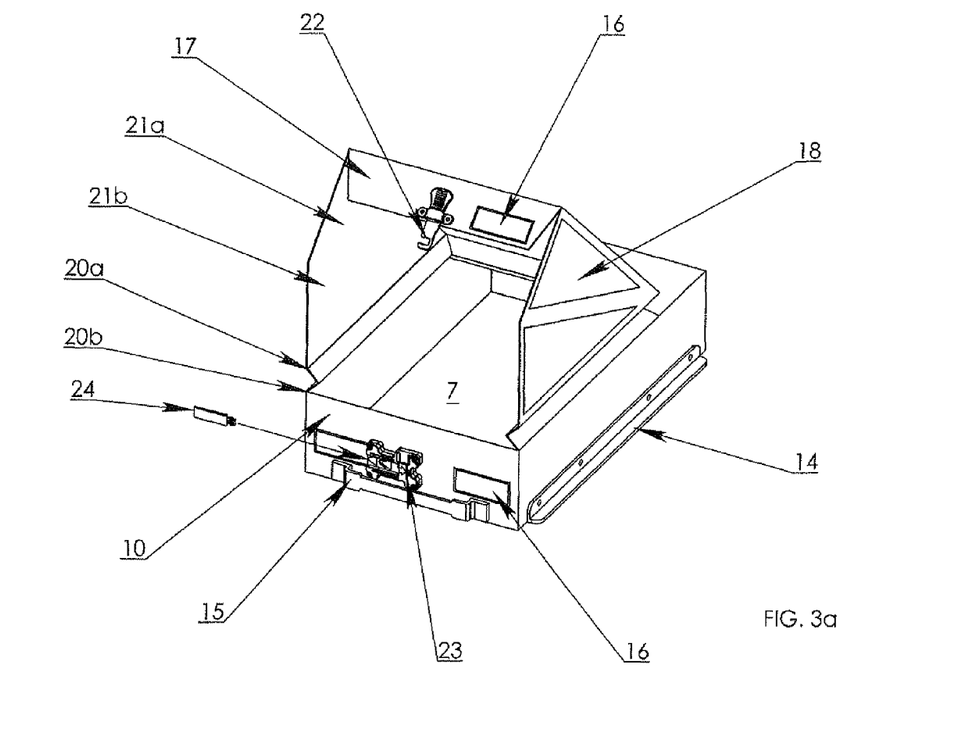

As shown most clearly in the open view of FIG. 3a, the lid 11 has a flap 17 at its forward end which can fold over the front 10 of the tray. The lid also has folding sides or webs 18 which fold under the lid when closed. These provide security by preventing access to the tray under the closed lid from the sides. In this embodiment there are three fold axes on each side, two above and parallel to the top edge of the tray side and one at an angle to the top edge of the tray side. The folding sides thus include a pair of narrow rectangular webs 20a, 20b and a pair of triangular webs 21a, 21b.

The lid is preferably formed of a flexible material, for example clear polyvinylchloride material with a rigid polypropylene reinforcement, so that the drawer can easily accommodate items of different heights (for example differently sized boxes containing perfume). It is also convenient if the lid is transparent so that the airline steward or stewardess can see what is inside the drawer without opening it.

In this embodiment, the flap at the front of the lid has a catch 22 which engages in a lockable chamber 23 on the front of the drawer, a breakable seal 24 being insertable into the chamber to engage the catch. The seal has a unique identification mark (usually a number or bar code) so that the closing of the drawer is tamper-evident. The drawer can only be opened by breaking the seal. The combination of the catch and chamber provide the lock unit to close the drawer in a tamper-evident manner.

The lock can be substantially as shown in GB-A-2463472. As described in that publication, the chamber 23 on the front of the drawer has a top opening for the catch 22 and a side opening for receiving part of the breakable seal which locks into the catch in such a manner that it cannot be removed without breaking. The seal 24 is shown to the left of the drawer, with an arrow indicating its direction of insertion.

The seal 24 comprises a head part and a body part, the head part in use locating in the catch through the side opening of the chamber 23. The catch 22 has a recess shaped to receive the head of the seal, the chamber being formed such that on breaking of the seal the head remains in the catch as it is removed from the chamber. The head of the seal is arrow-head shaped and the recess has a complementary shape, with a narrowed mouth. The chamber is a hollow housing whose interior communicates between the openings and thus provides a double-ended passageway for receiving the catch and the seal, and for allowing the head of the seal to be removed along with the catch. The catch and the chamber are riveted to the flap and tray front, in a conventional manner.

The seal 24 is conventional. It is substantially flat and includes the head part and body part. The head part has an arrowhead configuration with resilient barbs, in a known fashion. Between the body part and the head part is a line of weakness formed, for example, by an elongate recess, this line providing the breakable connection between the head and body parts. The main part in this embodiment is substantially square (it could be of any other desired shape). The overall dimensions of the seal are typically about 22 mm long by 11 mm wide by 2.5 mm thick. The thickness of the head is typically 2.0-2.5 mm; in practice the seal head is the same thickness as the body or slightly thinner.

To close the drawer the lid 11 is lowered. The top opening in the chamber 23 provides a seat for the catch 22 and the seal 24 is pushed into the chamber from the left hand side, the head part of the seal locating within the chamber and within the recess of the catch. In particular the resilient barbs are squeezed through a narrowed mouth of the recess to locate behind the shoulders of the recess so that the seal cannot be removed without breaking it. In this locked position it is obvious that the catch 22 cannot be pulled out of the chamber 23, as the laterally inserted seal 24 is blocked against the sides of the chamber.

To unlock and open the drawer, the user's finger is placed below the outer end of the seal 24 and the seal body is lifted. This causes the seal to be broken along the line of weakness so that the body is no longer retaining the catch 22. The lid 11 can thus be lifted. The head of the seal is retained in the chamber as described in GB-A-2463472.

Figure 4:
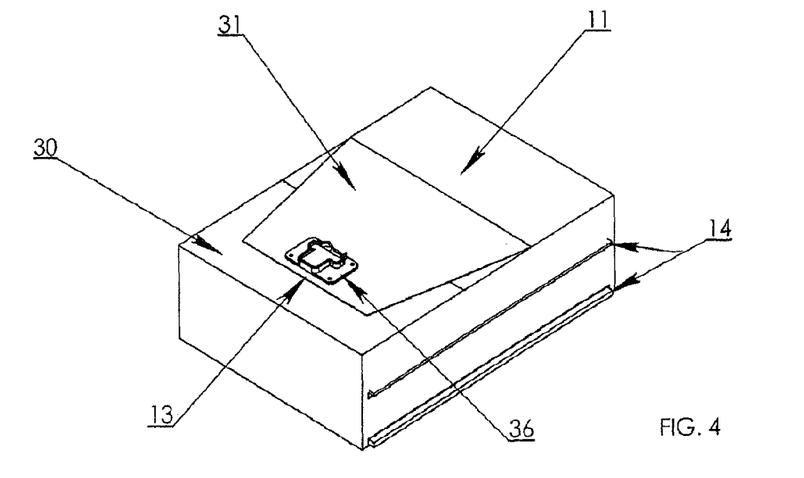
FIGS. 4 and 4a are perspective views of a drawer according to another embodiment of the invention, in its closed and open conditions.
Figure 4A:
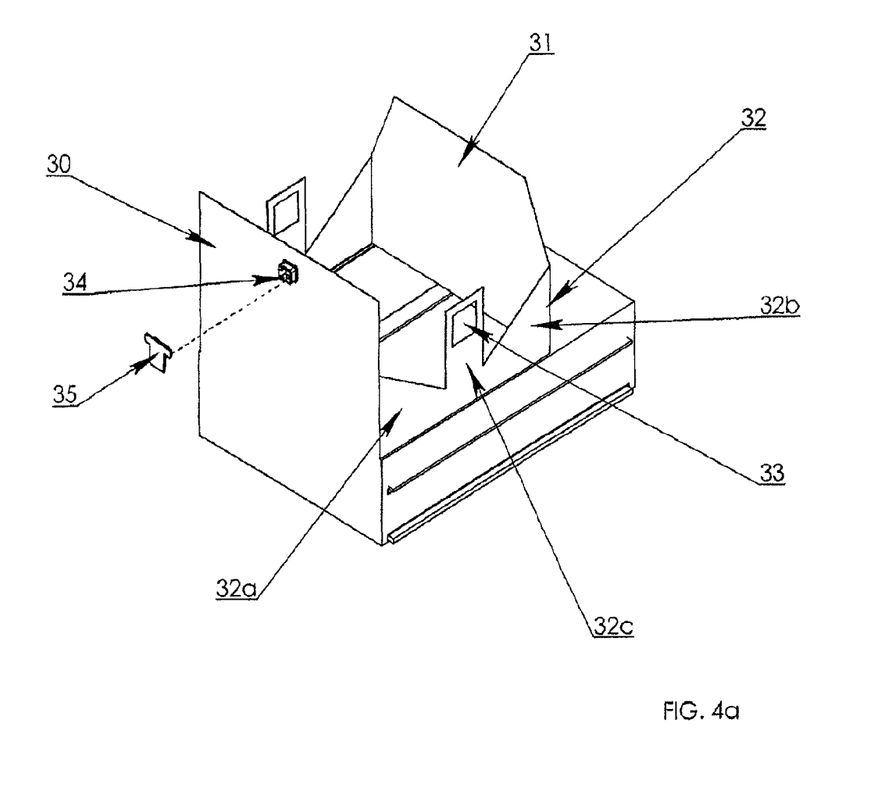

FIGS. 4 and 4a show an alternative embodiment of the drawer of the invention. In this embodiment the lid 11 is formed of a number of flaps which fold onto the top of the tray and the lock unit 13 is provided on the top, instead of the front. As shown more clearly in FIG. 4a, the drawer includes forward and rearward flaps 30, 31, plus side flaps 32. The side flaps include forward and rearward triangular sections 32a, 32b which meet at a flap tongue 32c which extends towards the centre of the tray (when the drawer is closed). At the ends of the tongue flaps 32c are apertures 33.

This embodiment uses a different lock-unit 13 to that of the first embodiment. The lock is substantially as known from GB-A-2358377. The front flap 30 has a raised chamber 34 in which is locked a breakable seal 35 and the rearward flap 31 has a location plate 36 which forms an apertured catch.

The drawer is closed by first folding the forward flap 30 on top of the tray. Next the side flaps 32 are folded on top so that the apertures 33 fit over the raised chamber 34. Then the rearward flap 31 is folded on top so that the location plate 36 registers with the chamber, in known fashion. The chamber accommodates the protrusions of the seal.

As described in GB-A-2358377, the location plate 36 has two apertures which register with two apertures of the chamber 34. The seal 35 is of a generally T-shape has on one of its flat sides a first protrusion and a second protrusion for location in the apertures of the chamber 34. The first protrusion has the form of a tapered post. The second protrusion has an arrow-head configuration such that it positively engages into one of the apertures of the chamber. The seal has a line of weakness running across it, between the protrusions, so that the first protrusion can be removed from the chamber and from the plate in a first step, the second protrusion then being disengaged from the chamber in a subsequent, second step.

To close and seal the drawer, the flaps 30, 31, 32 are folded down and the location plate 36 is placed over the chamber 34. The seal 35 is then pushed onto the location plate and into the chamber to lock the lid 11, the arrow head configuration of the second protrusion locking in chamber 34 to secure the flaps together and lock the drawer. The drawer is now securely closed and can only be opened by removal of the seal. The folding arrangement of flaps is somewhat similar to that known from European Design 97399-0001 which shows an envelope closed by a similar seal 35.

To unlock the drawer, the user lifts the edge of the seal 35 to break it along its line of weakness (in known fashion) and remove one half of the seal away from the chamber. With the post-shaped protrusion no longer located in the chamber 34 the remaining half of the seal 35 is free to move and, in particular, the arrow head protrusion can be moved to a position in which the other half of the seal can be removed from the chamber. With both parts of the seal removed the flaps 30, 31, 32 can be unfolded and the lid 11 of the drawer can be opened.

The location plate is fixed to the material on the flap by fitting through a hole in the flap material and the material of the flap is then riveted to the flange of the location plate. The chamber is fixed in a corresponding fashion.

Figure 5:
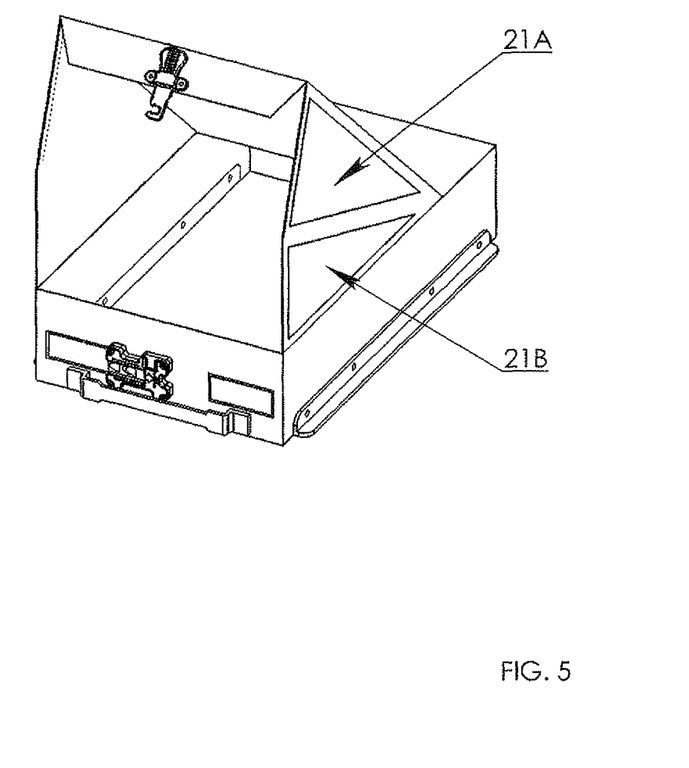
FIG. 5 is a perspective view of a drawer according to another embodiment of the invention, in its open condition.

FIG. 5 shows a drawer according to another embodiment of the invention. This embodiment is similar to that of FIG. 3 except that the side webs of the lid 11 are simpler, there being just two triangular webs 21a, 21b.

Figure 6:
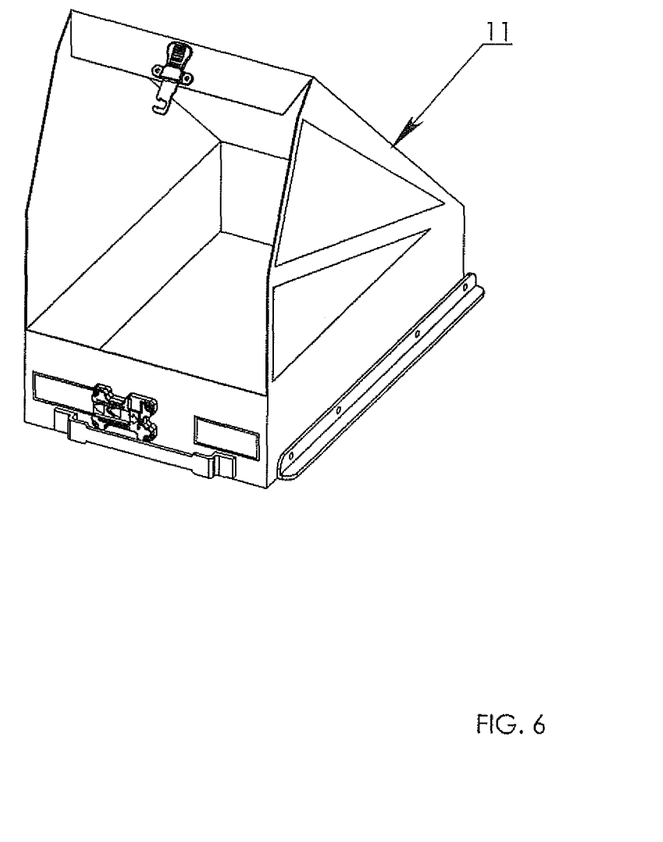
FIG. 6 is a perspective view of a drawer according to another embodiment of the invention, in its open condition.

FIG. 6 shows a drawer according to another embodiment of the invention. This embodiment is similar to that of FIG. 6, except the lid 11 hinges from the rear edge of the tray.

Figure 7:
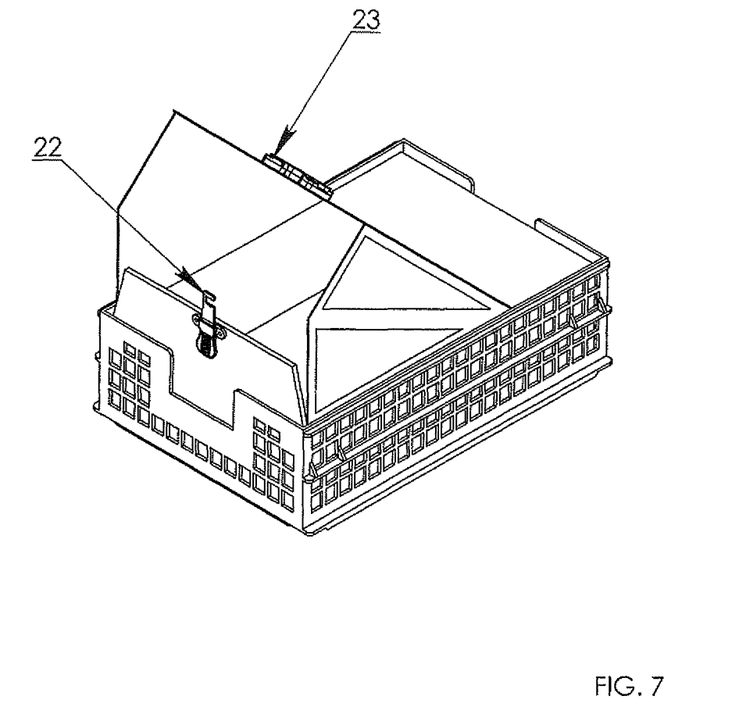
FIG. 7 is a perspective view of a drawer according to another embodiment of the invention, in its open condition.

FIG. 7 shows a drawer according to another embodiment of the invention. In this embodiment the tray is formed of perforated walls rather than solid walls. The lid arrangement is somewhat similar to that of FIG. 3 but different in that the catch 22 is formed on a flap 40 connected to the front 10 of the tray and the chamber 23 is fitted to the lid. In other words, the catch and chamber arrangement in FIG. 7 is opposite to that of FIG. 3.

The chambers, location plates and fastener catches in the above embodiments may be formed of any suitable material, such as hardened steel, or of plastics such as nylon, polypropylene, ABS, styrene or engineering plastics. The disposable seals, which will generally be supplied in bulk, are formed of a suitable resilient but frangible plastics material, such as styrene, ABS, nylon or polypropylene.

Although the embodiments shown above include folding lids, it is possible that the lid may include a zipped opening in the manner of a zipped mail bag which is locked with a breakable seal in known manner. The trays may be delivered "flat-packed" to users, and are assembled on site using plastic corner braces.

The trays may be formed of polymer materials so as to achieve weight savings, for example polyvinylchloride, polypropylene, acrylonitrile butadiene styrene or glass-reinforced nylon, and may be formed of solid walls or perforated walls (as in FIG. 7). The flexible lids may stitched to the tray walls and then hot welded. The reinforcement plates within the lids may be riveted, as are the runners to the sides of the trays.

It is important that the weight of the drawers be kept to a minimum as all weight on an aircraft contributes to fuel consumption. It is believed that the present invention can assist in reducing the weight of trolleys by the use of the new drawer design described and claimed.

The invention claimed is:

1. A drawer for an airline trolley which comprises a substantially rectangular tray with a base, sides, front and back, the sides having means for cooperation with the inside of the trolley for allowing the drawer to slide therein, wherein the drawer includes a lid which closes top of the tray, wherein the lid comprises at least one flap which is openable, and wherein the drawer has a lock unit with which the flap engages, the lock unit being lockable by means of a breakable seal.

2. A drawer for an airline trolley according to claim 1, wherein the flap is connected to the sides of the tray by webs which fold under the flap in its closed position, the webs preventing access to the interior of the tray under the lid.

3. A drawer for an airline trolley according to claim 1, wherein the flap has a catch at its forward end which engages in the lock unit on the front of the drawer, a breakable seal being insertable into the lock unit to engage the catch.

4. A drawer for an airline trolley according to claim 3, wherein the flap has a forward part which folds over onto the front of the tray when closed.

5. A drawer for an airline trolley according to claim 1, wherein the front of the tray has a flap with a catch at its forward end and the lock unit is on the lid, a breakable seal being insertable into the lock unit to engage the catch.

6. A drawer for an airline trolley according to claim 1, wherein lid is formed of at least two flaps which fold on top of the tray and on top of each other, one flap having an apertured catch which registers with the lock unit on the other flap, a breakable seal being insertable into the lock unit to lock the catch place.

7. A drawer for an airline trolley according to claim 6, wherein there is at least a forward flap hinging from the front of the tray and a rearward flap hinging from a position at or near the rear of the tray.

8. A drawer for an airline trolley according to claim 7, wherein side flaps are provided, connecting with the forward and rearward flaps, the side flaps including tongues with apertures which register with the lock unit when the flaps are folded on top of the tray.

9. A drawer for an airline trolley according to claim 1, wherein the cooperating means are runners.

10. An airline trolley containing a plurality of drawers according to claim 1.

11. A method of packing an airline trolley comprising the steps of filling a plurality of lidded drawers with items, closing the lids such that respective flaps extend across at least a portion of respective fronts of the drawers, locking the lids with respective breakable seals respectively extending from the respective flaps, and sliding the drawers into the trolley.

12. A method of packing an airline trolley having a drawer according to claim 7.

13. A method of packing an airline trolley comprising the steps of filling a plurality of lidded drawers with items, closing the lids, locking the lids with a breakable seal, and sliding the drawers into the trolley wherein:

the drawer comprises a substantially rectangular tray with a base, sides, front and back, the sides having means for cooperation with the inside of the trolley for allowing the drawer to slide therein, wherein the drawer includes a lid configured to close substantially the entire top of the tray, the lid comprises at least one flap which is openable, and the drawer has a lock unit with which the flap engages, the lock unit being lockable by means of a breakable seal.

14. A method of packing an airline trolley according to claim 13, wherein the flap is configured to overlap with the front or side of the drawer.

15. The drawer for an airline trolley according to claim 1, wherein the lid is configured to cover at least a majority of the drawer and the flap is configured to overlap with the front or side of the drawer.

16. A drawer for an airline trolley according to claim 1, wherein the lid includes a top cover that, when closed, results in the entire top of the tray being closed.

17. A drawer for an airline trolley according to claim 1, wherein the flap extends over a front end of the drawer.

18. A drawer for an airline trolley according to claim 1, wherein the lock unit is located at an exterior end of the drawer.

19. A drawer for an airline trolley according to claim 1, wherein the lid includes a top cover to which the flap is connected, a connection between the top cover and the flap being located at a front of the drawer when the lid is closed.

20. A drawer for an airline trolley according to claim 1, wherein the lock unit is accessible with the tray fully retracted into the airline trolley.

* * * * *